United States Patent [19]
Brandin

[11] Patent Number: 5,927,752
[45] Date of Patent: Jul. 27, 1999

[54] APPARATUS AND METHODS FOR DETERMINING SEAT OCCUPANT PARAMETERS PRIOR TO DEPLOYMENT OF AN AUTOMOBILE AIRBAG

[76] Inventor: Börje A. Brandin, Route du Port 12A, 1009 Pully, Switzerland

[21] Appl. No.: 08/858,704

[22] Filed: May 19, 1997

[51] Int. Cl.[6] .............................. B60R 21/32; G01C 3/00
[52] U.S. Cl. ........................................ 280/735; 356/3.01
[58] Field of Search .................................. 280/735, 734; 180/271, 272; 356/3.01; 359/313; 340/425.5, 438, 436, 667

[56] References Cited

U.S. PATENT DOCUMENTS

| | | | |
|---|---|---|---|
| 5,118,134 | 6/1992 | Mattes et al. | 280/735 |
| 5,330,226 | 7/1994 | Gentry et al. | 280/735 |
| 5,404,128 | 4/1995 | Ogino et al. | 340/425.5 |
| 5,439,249 | 8/1995 | Steffens, Jr. et al. | 280/735 |
| 5,446,661 | 8/1995 | Gioutsos et al. | 364/424.05 |
| 5,474,327 | 12/1995 | Schousek | 280/735 |
| 5,482,314 | 1/1996 | Corrado et al. | 280/755 |
| 5,490,069 | 2/1996 | Gioutsos et al. | 364/424.05 |
| 5,528,698 | 6/1996 | Kamei et al. | 382/100 |
| 5,573,269 | 11/1996 | Gentry et al. | 230/735 |
| 5,602,734 | 2/1997 | Kithil | 364/424.055 |
| 5,848,802 | 12/1998 | Breed et al. | 280/735 |

FOREIGN PATENT DOCUMENTS 64-134177  1/1991  Japan .................................. 180/272

*Primary Examiner*—Lanna Mai
*Assistant Examiner*—Faye M. Fleming
*Attorney, Agent, or Firm*—Rockey, Milnamow & Katz, Ltd.

[57] ABSTRACT

Apparatus for determining the location and other body parameters of a seat occupant prior to deployment of an automobile airbag comprises a vector sensing device, and an electronic controller operatively coupled to the vector sensing device. The vector sensing device senses the vector extending between a fixed point of reference on an automobile and a seat occupant's eyes after the occupant assumes a sitting position. The electronic controller first determines a current location for the occupant's eyes based upon the vector signals, and the determines inflation parameters based upon the current location, anthropometric data, and a dynamic body model. The vector sensing device may comprise a manually operable light directing device pivotally mounted to the vehicle about the point of reference for directing a visible light ray at the occupant's eyes, a direction detecting sensor coupled to the light directing means for detecting the direction of the visible light ray relative to the point of reference, and a distance sensor located near the light directing means for sensing the distance between the point and the occupant's eyes.

16 Claims, 5 Drawing Sheets

APPARATUS AND METHODS FOR DETERMINING SEAT OCCUPANT PARAMETERS PRIOR TO DEPLOYMENT OF AN AUTOMOBILE AIRBAG

FIELD OF THE INVENTION

This invention relates to methods and apparatus for controlling the deployment of automobile airbags.

Airbags are passive restraint devices, widely used to protect driver and passenger in an automobile when it collides with an outside object, often another car. The use of airbags has undoubtedly saved many lives, but in some circumstances, the inflating airbag may injure the person to be protected and, in a few cases, people have been killed by the impact of an airbag inflation. At the moment of collision, the body of the driver and passenger start moving relative to the body of the car. The airbag system is so designed that the bag inflates very rapidly at impact, the object being to put a cushion in front of and at a close distance from the head and chest of an occupant before they have moved but a short distance. To avoid injuries, it is very important that the position of the inflated bag and the timing of the inflation are correct. If the still expanding airbag hits the body, this would result in a powerful, possibly damaging blow. If the fully inflated airbag is too distant from the body, this would permit possibly damaging movement of the body especially of the head and neck. From the aforesaid, it is clear that in order to obtain maximum protective effect from the airbag, and to limit the risks of damage by the bag itself, the system must adjust the way it inflates in relation to the position and size of the body to be protected.

A number of devices seeking to fulfil this need are already under development. Breed Engineering of Lakeland, Florida, has designed a system that uses a sensor under the seat that can tell how far back someone is sitting in that seat. Breed also uses a pressure sensor in the seat cushion. This makes it possible to measure approximately the weight of a person in the seat and so distinguish a small child from a full-sized adult. The information on position and weight are fed to a microprocessor, which is programmed to decide how quickly the airbag needs to be inflated if a collision occurs, or if it needs to be inflated at all.

Other airbag engineers are planning to use cameras to determine the position of a driver's or passenger's body. The TRW safety system of Washington, Michigan has gone one step further and developed an advanced restraint system equipped with an ultrasonic transceiver that can detect the size and position of a passenger with great precision.

These prior art systems have certain disadvantages. In the case of the Breed system, the determination of the longitudinal position of the body requires a special sensor and electric circuit; the weight is an approximate determination and an electric circuit is needed; and the length of the body cannot be determined with any precision from the seat position even when completed with the information of the weight. For camera based systems and TRW, the disadvantage of camera and ultra sonic systems are essentially the fairly high cost and problems associated with accuracy, e.g. a person with a hat.

There is accordingly a need for airbag control apparatus which eliminates the weaknesses listed above and provides precision where the required measurements are concerned at a lower cost.

SUMMARY OF THE INVENTION

The subject invention is directed toward apparatus and methods for determining with precision the location, size and other body parameters of a seat occupant, prior to deployment of an automobile airbag.

The apparatus comprises vector sensing means for sensing a vector extending between a fixed point of reference on the automobile and a seat occupant's eyes after the occupant assumes a sitting position, and for generating vector signals and an electronic controller operatively coupled to the vector sensing means. The electronic controller comprises means for determining a current location for the occupant's eyes based upon the vector signals, means for determining inflation parameters based upon the current location, and means for generating control signals indicative of the inflation parameters. The inflation parameters are preferably also based upon anthropometric data and a dynamic body model.

The vector sensing means may comprise manually operable light directing means pivotally mounted to the vehicle about the point of reference for directing a visible light ray at a seat occupant's eyes; direction detecting means coupled to the light directing means for detecting the direction of the visible light ray relative to the point of reference and generating direction signals correlatable therewith; and distance sensing means located proximate the light directing means for sensing the distance between the point and the occupant's eyes along the path of the visible light ray and generating distance signals correlatable therewith.

In another embodiment, the vector sensing means comprises an adjustable rearview mirror pivotally mounted to the automobile for pivotal movement relative to the point of reference; distance sensing means for sensing the distance between the proximate mirror and the seat occupant and generating distance signals correlatable therewith; and orientation detecting means for detecting the orientation of the proximate mirror after adjustment by the seat occupant to achieve a desired rearview sightline, and generating orientation signals correlatable therewith.

The method of the subject invention comprises the steps of sensing a vector extending between a fixed point of reference on the automobile and a seat occupant's eyes after the seat occupant assumes a sitting position, and generating vector signals correlatable with the vector; determining a location for the occupant's eyes based upon the vector signals; determining inflation parameters based upon the current location, and generating control signals indicative of the inflation parameters.

BRIEF DESCRIPTION OF THE DRAWINGS

The invention will now be described, by way of example only, with reference to the following drawings, in which.

DETAILED DESCRIPTION OF THE PREFERRED EMBODIMENT

Figure 1:
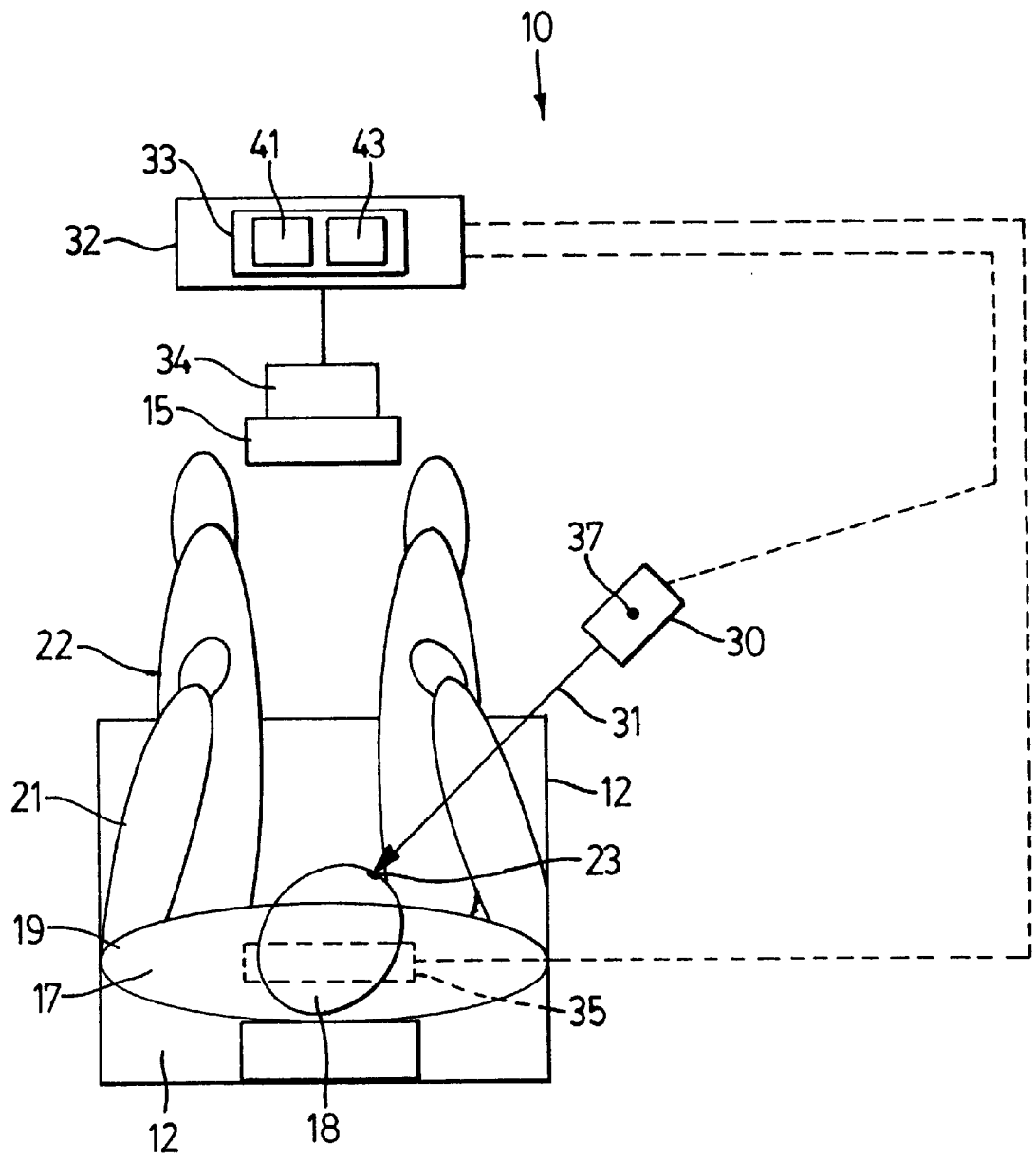
FIG. 1 is a schematic top plan view of apparatus made in accordance with the subject invention.

Referring to FIG. 1, illustrated therein is airbag control apparatus 10 made in accordance with the subject invention, installed on an automobile equipped with an occupant seat 12 and airbag 15. Seat occupant 17 is shown seated in seat 12 with head 18, torso 19, arms 21, and legs 22 in a sitting position. Seat occupant 17 may be a driver or passenger.

The location 23 of the eyes of seat occupant 17 is modelled as being the midpoint between the occupant's eyes on the surface of the occupant's head 18, although such location could be alternatively modelled as a cyclopic eye point within occupant's head 18 about which the occupant's head 18 pivots, after occupant 17 has assumed a sitting position.

Airbag control apparatus 10 comprises vector sensing means 30 and electronic controller 32. Vector sensing means 30 senses vector 31 extending between a point of reference 37 fixed relative to automobile and seat occupant's eyes 23 after seat occupant 17 assumes a sitting position, and generates sensor output signals correlatable with vector 31. Vector sensing means 30 senses vector 31 by detecting the magnitude and direction of a line extending between point of reference 37 and seat occupant's eyes 23.

Electronic controller 32 preferably comprises a microcomputer 33 electrically coupled to vector sensing means 30, comprising a microprocessor 41, a magnetic storage device 43 and typical input and output devices. Microcomputer 33 is programmed to (1) determine current location values for the occupant's eyes based upon the vector signals and vehicle geometry parameters and (2) determine inflation parameters based upon the current location values. Controller 32 then outputs control signals indicative of the inflation parameters to airbag inflation device 34, which is adapted to inflate airbag 15 in accordance with the control signals.

Apparatus 10 may also include optional seat pressure sensor 35 within seat 12 which detects the weight of occupant 17 and generates weight signals to controller 32.

Figure 2:
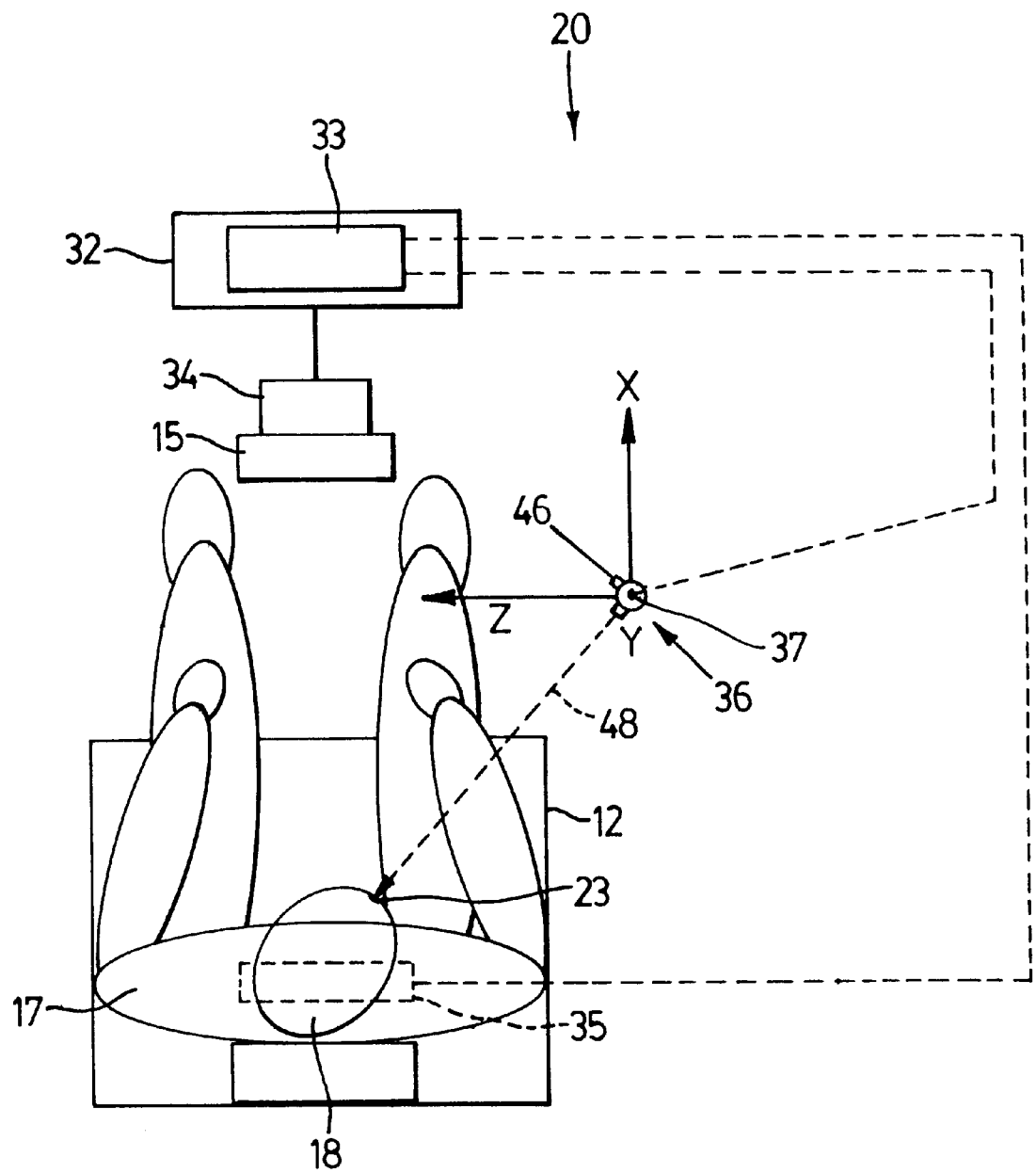
FIG. 2 is a schematic top plan view of one preferred embodiment of the subject invention.
Figure 3:
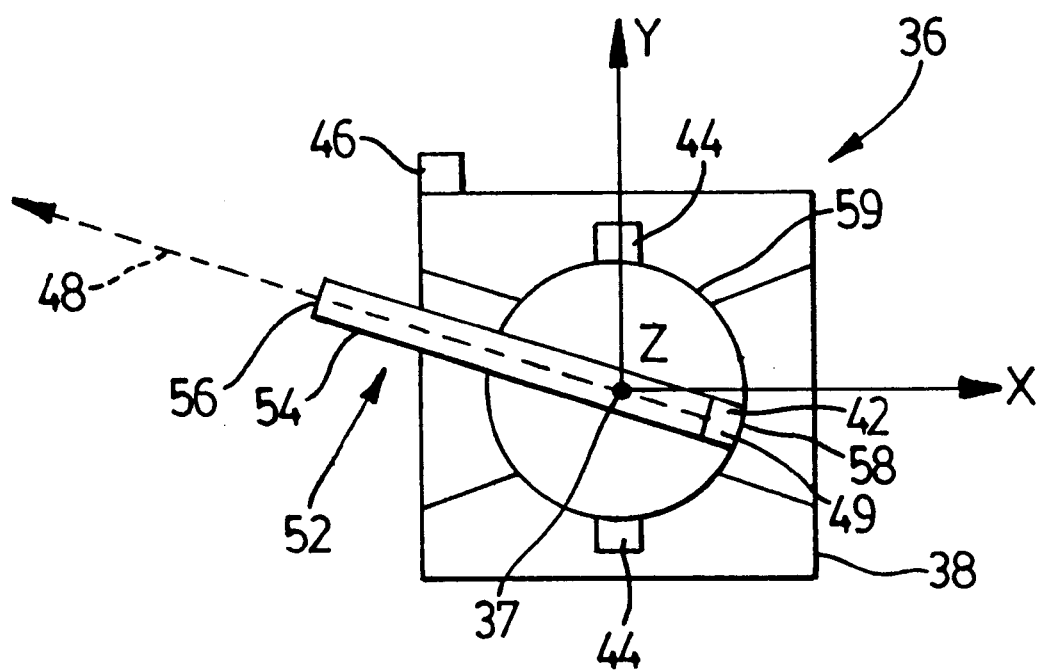
FIG. 3 is a sectional view of the vector sensing means of the embodiment shown in FIG. 2.

Referring now to FIGS. 2 and 3, in one preferred embodiment, shown generally as 20, vector sensing means 30 comprises manipulatable light directing device 36, distance sensor 42, direction sensors 44, and activation switch 46. Light directing device 36 is pivotally mounted to the automobile at reference point 37 by mount 38. Distance sensor 42, typically an infrared or ultrasound sensor, determines the distance between point 37 of light directing device 36 and the occupant's eyes' 23 along directed light ray 48. Direction sensors 44 detect the direction of light ray 48 extending from point 37 of light directing device 36 to occupant's eyes' 23 after light directing device 36 has been manually adjusted by occupant 17. Switch 46 located on mount 38 activates distance sensor 42, and direction sensors 44.

As best shown in FIG. 3, light directing device 36 preferably comprises light source 49 and view restriction means 52 pivotally mounted in mount 38 for rotation about reference point 37. View restriction means 52 is preferably a narrow non-transparent non-glossy tube 54 having a free open end 56 and a closed end 58 embedded in a ball-in-socket joint 59. Light source 49 is located inside tube 54 near closed end 58, and generates directed light ray 48 through open end 56. Ball-in-socket joint 59 enables tube 54 to pivot over a wide range of directions about pivot point 37. Light source 49 is preferably an LED (light emitting diode) that emits a beam of light suitable to be viewed by the driver.

Direction sensors 44 may comprise a two degree of freedom electromechanical rotational-position sensing device able to detect the rotational movement of light directing device 36 about the Y axis and about a rotational axis orthogonal to the Y axis.

Figure 4:
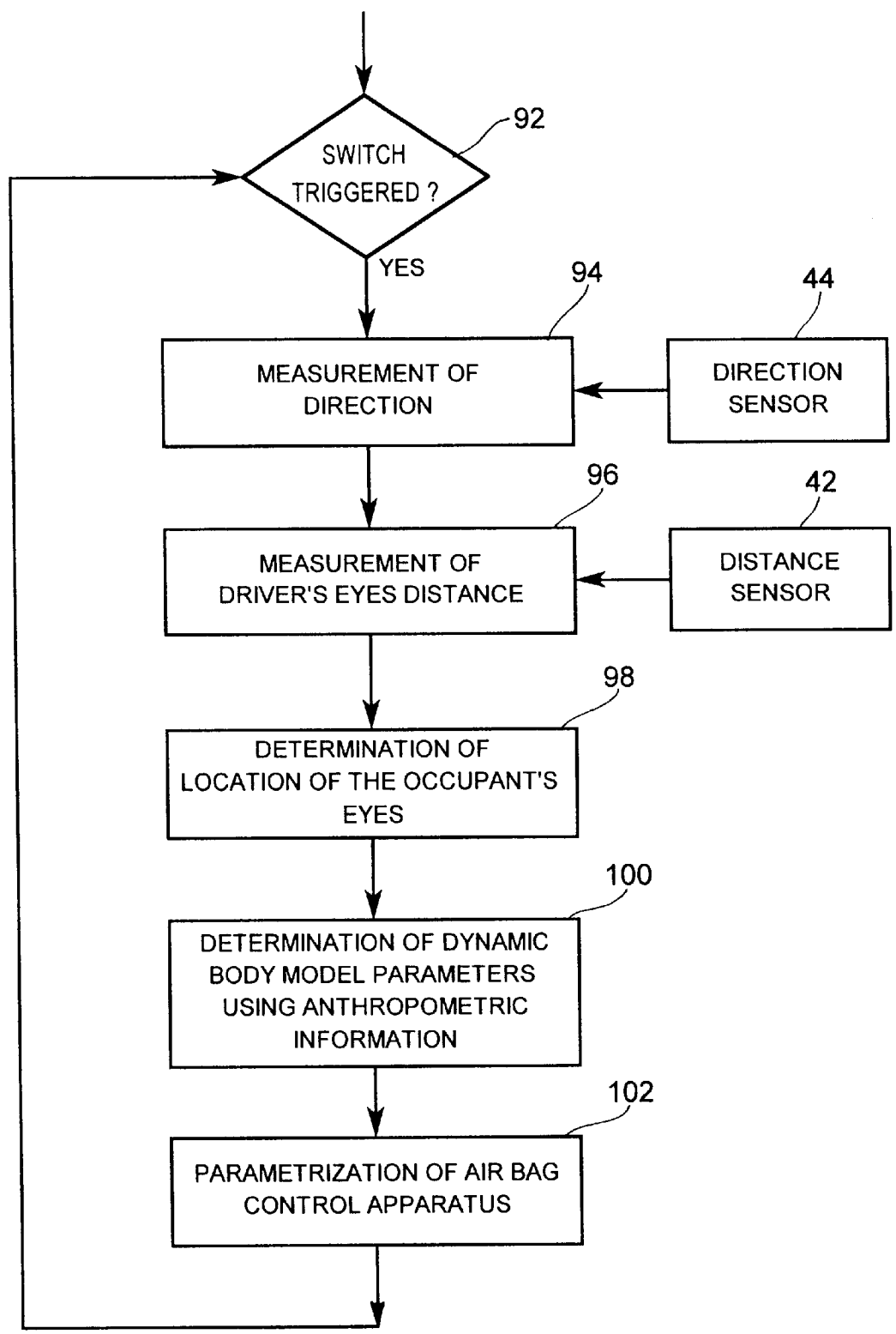
FIG. 4 is a flow chart illustrating a preferred embodiment of the method of the subject invention.

Referring now to FIG. 4, illustrated therein are the steps performed by the computer program of microcomputer 33 to determine the inflation parameters. Microcomputer 33 checks to see if switch 46 is activated at step 92. If so, microcomputer 33 inputs the current distance from distance sensor 42 at step 94, and inputs the current direction signal from direction sensor at 44 at step 96. Microcomputer 33 then determines the location of the occupant's eyes at step 98, based upon the distance signals, the direction signals, and various known geometrical and other parameters. At step 100, dynamic body model parameters are determined, using stored anthropometric information. The location of the occupant's eyes is then used in conjunction with the dynamic body model parameters to determine appropriate inflation parameters at step 102.

The dynamic body model of step 100 treats the body of occupant 17, for the purposes of the dynamic events occurring during a collision, as being composed of a number of fairly rigid, flexibly linked elements, namely, head 18, torso 19, arms 21, and legs 22, moving with respect to another and with respect to seat 12. The dynamic body model uses anthropometric information regarding the dimension, position and mass of some of these elements, to help define the desired inflation parameters for the protection of seat occupant 17.

Airbag control apparatus 10 locates the eye position of a seat occupant, for the purpose of defining accurately the position and size of a driver or passenger, using input signals from sensors 42, 44. Since anthropometric data based on height can only indicate weights related to an average body of the height measured, the accuracy of dynamic body model can be increased by obtaining a weight estimate from seat pressure sensor 35.

In operation, the seat occupant looks at light directing device 36 after assuming a sitting position, and orients, manually or otherwise, tube 54 so as to see light ray 48 emanating from light source 49, and then presses switch 46 to activate direction sensors 44 and distance sensor 42. Electronic controller 32 then determines the location of the occupant's eyes and the inflation parameters, and generates control signals correlatable therewith.

Figure 5:
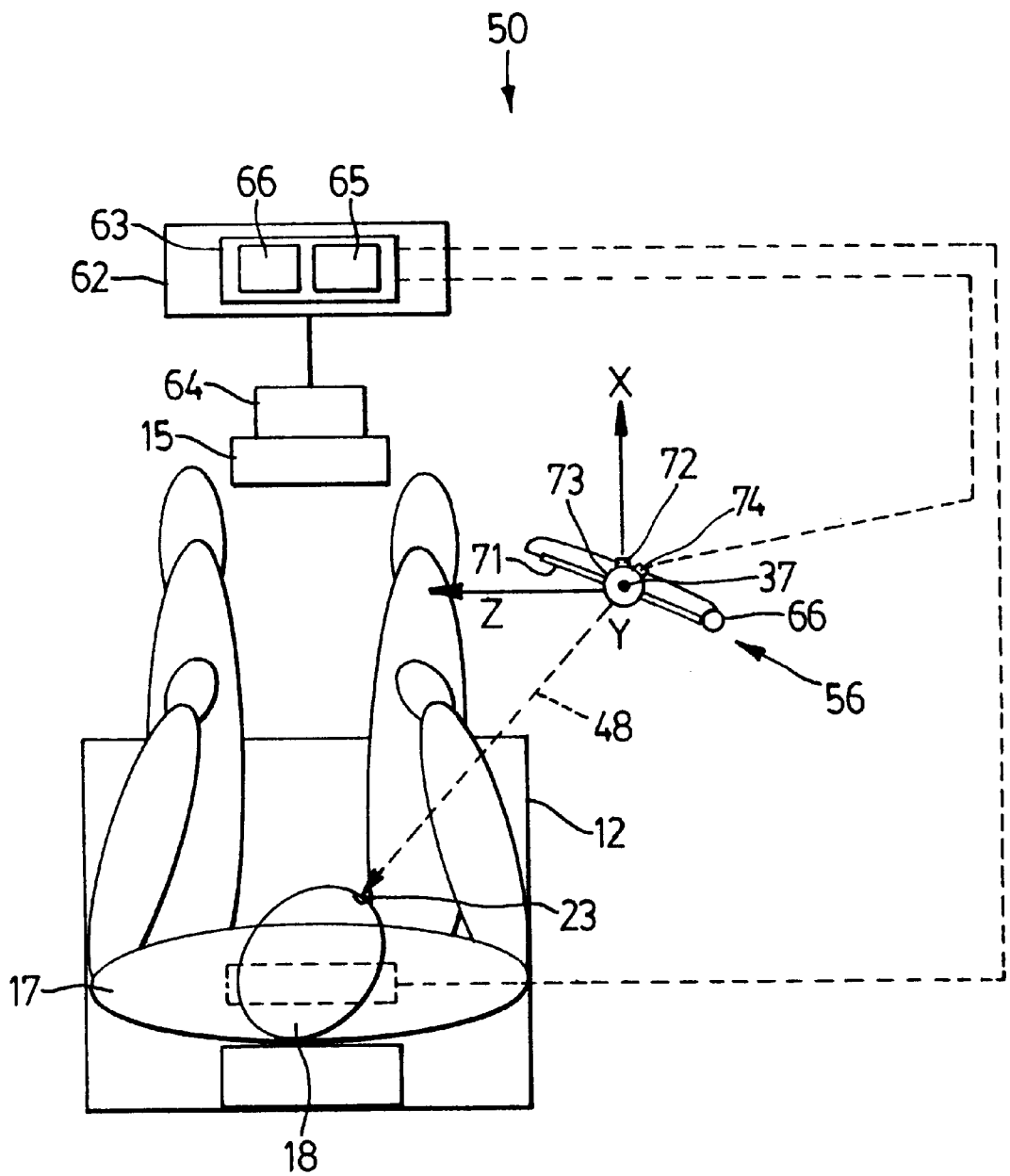
FIG. 5 is a schematic top plan view of another preferred embodiment of the invention.

Referring now to FIG. 5, in another preferred embodiment of the subject invention, airbag control apparatus, shown generally as 50, comprises vector sensing means shown generally as 56, and electronic controller 62. Vector sensing means 56 comprises an adjustable central rearview mirror 71 pivotally mounted to an automobile by mount 73 for pivotal movement relative to a point of reference 37, a distance sensor 72, an orientation detector 74, and an activation switch 66. Distance sensor 72 senses the distance between point 37 and the driver's eyes 23, and generates distance signals correlatable therewith. The orientation detector 74 detects the orientation of mirror 71 after adjustment by driver 17 to achieve a desired rearview sightline, and generates orientation signals correlatable therewith. Distance sensor 72 may be an infrared or ultrasound sensor similar to distance sensor 42 of the previous embodiment. Orientation detector 74 may be similar to direction detector 44 of apparatus 10.

Electronic controller 62 preferably comprises microcomputer 63 having storage means 65, input means for receiving input signals generated by distance sensor 72 and orientation detector 74, processing means 66 for determining the inflation parameters based upon the input signals, and output means for generating control signals correlatable with the inflation parameters, which are output to airbag inflation device 64.

Electronic controller 62 preferably determines the location of occupant's eyes 23 by utilizing an equation for a parabola having a focus located at occupant's eyes 23, and an axis parallel to a rearview vector representing a desired rearview sightline, and falling in a plane containing the rearview vector, the plane being perpendicular to mirror 71, and containing the center point of mirror 71, and means for determining the location of the focus of the parabola.

The location of the driver's eyes may be determined in the manner described in the Applicant's co-pending U.S. patent application Ser. No. 08/806,023, the disclosure of which is incorporated by reference.

Electronic controller 62 of airbag control apparatus may also be programmed to determine the proper orientation for one or more side rearview mirrors, and send control signals to servomechanisms to automatically orient side mirrors based upon the location of the driver's eyes.

While the above description has been formulated with frontal airbags in mind, but it must be stressed that a very similar approach could be used for lateral airbags for both driver and passenger.

It should therefore be apparent that various modifications can be made to the preferred embodiments described and illustrated herein, without departing from the subject invention, the scope of which is defined in the appended claims.

I claim:

1. Apparatus for determining seat occupant parameters prior to deployment of an automobile airbag, comprising:
    (a) vector sensing means for sensing a vector extending between a fixed point of reference on an automobile and a seat occupant's eyes after the occupant assumes a sitting position, and for generating vector signals; and
    (b) an electronic controller operatively coupled to the vector sensing means comprising means for determining a current location for the occupant's eyes based upon the vector signals, means for determining inflation parameters based upon the current location, and means for generating control signals indicative of the inflation parameters.

2. The apparatus defined in claim 1, wherein the means for determining inflation parameters determines the inflation parameters based upon the current location, anthropometric data and a dynamic body model.

3. The apparatus defined in claim 1, wherein the vector sensing means comprises:
    (a) manually operable light directing means pivotally mounted to the vehicle about the point of reference for directing a visible light ray at the occupant's eyes;
    (b) direction detecting means coupled to the light directing means for detecting the direction of the visible light ray relative to the point of reference and generating direction signals correlatable therewith; and
    (c) distance sensing means located proximate the light directing means for sensing the distance between the point and the occupant's eyes along the path of the visible light ray and generating distance signals correlatable therewith.

4. The apparatus defined in claim 3, wherein the light directing means comprises a light source and view restriction means for restricting the occupant from viewing the light source when the light source is not directed at the driver's eyes.

5. The apparatus defined in claim 4, wherein the view restriction means comprises a narrow non-transparent tube pivotally mounted in a mount for pivotal movement about the point, the tube having an open free end and a closed end, the light source being located in the tube near the closed end thereof.

6. The apparatus as defined in claim 3, also comprising activation means operable by the occupant for activating the direction detecting means and the distance sensing means.

7. The apparatus defined in claim 1, also comprising airbag inflation means operatively coupled to the controller for inflating the airbag in accordance with the control signals.

8. The apparatus defined in claim 3, wherein the electronic controller comprises a microcomputer having storage means for storing vehicle geometry parameters, input means for receiving the distance signals and the direction signals, processing means coupled to the input means for determining the inflation parameters based upon the distance signals, the direction signals and the vehicle geometry parameters, and output means for generating control signals correlatable with the inflation parameters.

9. The apparatus defined in claim 3, wherein the distance sensing means comprises an infrared sensor mounted on the light directing means.

10. The apparatus defined in claim 3, wherein the distance sensing means comprises an ultrasound sensor mounted on the light directing means.

11. The apparatus defined in claim 3, wherein the light source comprises a light emitting diode.

12. Apparatus defined in claim 1, wherein the vector sensing means comprises:
    (a) an adjustable rearview mirror pivotally mounted to the automobile for pivotal movement relative to the point of reference;
    (b) distance sensing means for sensing the distance between the mirror and the seat occupant's eyes and generating distance signals correlatable therewith; and
    (c) orientation detecting means for detecting the orientation of the mirror after adjustment by the seat occupant to achieve a desired rearview sightline, and generating orientation signals correlatable therewith.

13. The apparatus defined in claim 12, wherein the electronic controller comprises means for determining an equation for a parabola having a focus located at the driver's eyes and an axis parallel to a rearview vector representing the desired rearview sightline, and falling in a plane containing the rearview vector, the plane being perpendicular to the mirror, and containing the center point of the mirror, and means for determining the location of the focus of the said parabola.

14. A method for determining seat occupant parameters prior to the deployment of an automobile air bag, comprising the steps of:
    (a) sensing a vector extending between a fixed point of reference on an automobile and a seat occupant's eyes once the occupant assumes a sitting position, and generating vector signals correlatable with the vector;
    (b) determining a current location for the occupant's eyes based upon the vector signals; and
    (c) determining inflation parameters based upon the current location, and generating control signals indicative of the inflation parameters.

15. The method defined in claim 14, wherein sensing the said vector comprises the steps of:
    (a) sensing the magnitude of a line extending between the fixed point of reference and the seat occupant's eyes; and
    (b) sensing the direction of the line.

16. The method defined in claim 14, wherein the step of determining the inflation parameters utilizes anthropometric information and a dynamic body model.

* * * * *